Patented May 27, 1952

2,598,014

UNITED STATES PATENT OFFICE 2,598,014

CONVERSION OF HYDROCARBON DISULFIDES TO SULFONYL CHLORIDES

Wayne A. Proell, Chicago, Ill., and Wilbur B. Chilcote and Bernard H. Shoemaker, Hammond, Ind., assignors to Standard Oil Company, Chicago, Ill., a corporation of Indiana No Drawing. Application July 26, 1950, Serial No. 176,064

10 Claims. (Cl. 260—543)

This invention relates to a catalytic process for the conversion of hydrocarbon disulfides to the corresponding sulfonyl chlorides. More particularly, it relates to a process for the preparation of alkanesulfonyl chlorides by the reaction of alkyl disulfides with both chlorine and oxygen in the presence of a nitrogen oxide catalyst.

Hydrocarbon sulfonyl chlorides are highly reactive chemical intermediates and numerous syntheses therefor have been developed. Because of the relatively low cost and commercial availability of large volumes of hydrocarbon disulfides, particularly alkyl disulfides which are available as petroleum refinery by-products, attempts have been made to prepare the corresponding hydrocarbon sulfonyl chlorides from these raw materials. The prior processes for the synthesis of hydrocarbon sulfonyl chlorides from the corresponding hydrocarbon disulfides have been characterized by gross chlorine wastage which outweighed the relatively low cost of the hydrocarbon disulfide charging stock. The process by which hydrocarbon disulfides were converted to sulfonyl chlorides in the prior art can be expressed by the following equation:

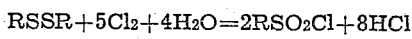
$$RSSR + 5Cl_2 + 4H_2O = 2RSO_2Cl + 8HCl$$

It will be apparent from this equation that only 20 mol percent chlorine utilization is the maximum that was theoretically attainable. The prior art process also posed a considerable HCl disposition problem.

It is an object of this invention to provide a process for the preparation of hydrocarbon sulfonyl chlorides by the catalytic interaction of oxygen and chlorine with a hydrocarbon disulfide. Another object of our invention is to provide a novel process for the preparation of hydrocarbon sulfonyl chlorides from the corresponding hydrocarbon disulfides, which process is characterized by 100 percent theoretical efficiency of chlorine utilization. An additional object of our invention is to provide a process for the preparation of hydrocarbon sulfonyl chlorides from the corresponding hydrocarbon disulfides under substantially anhydrous operating conditions in order to avoid chlorine wastage by reaction with water. These and other objects of our invention will become apparent from the following description thereof.

We have made the surprising discovery that a smooth reaction occurs in mixtures of a hydrocarbon disulfide, chlorine and oxygen in the presence of a catalytic proportion of nitrogen dioxide at low temperatures and pressures under substantially anhydrous conditions to produce principally hydrocarbon sulfonyl chlorides in relatively high yield, unaccompanied by the substantial production of by-products derived by chlorine substitution in the hydrocarbon radicals of the hydrocarbon disulfide feed stock or hydrocarbon sulfonyl chloride product. It is surprising that mixtures of chlorine and oxygen will react as described above with hydrocarbon disulfides to produce hydrocarbon sulfonyl chlorides, since it has been reliably reported that the treatment of hydrocarbon disulfides with chlorine results in extensive chlorine substitution for hydrogen in the hydrocarbon radical of the hydrocarbon disulfide (note, for example, H. Lecher et al., Ber. 55, 1474 (1922) and R. Connor in H. Gilman, "Organic Chemistry" vol. 1, pages 920-3 (1943)). It is known that the action of oxygen alone upon a hydrocarbon disulfide in the presence of nitrogen oxide catalysts yields sulfonic acid in the presence of water (note, for example, U. S. Patents 2,433,395-6) and sulfonic anhydrides in the absence of water (note, for example, U. S. Patent 2,489,316). It was, therefore, surprising to find that mixtures of chlorine and oxygen react with hydrocarbon disulfides, preferably under substantially anhydrous, relatively low temperature-low pressure operating conditions to produce substantially only the corresponding hydrocarbon sulfonyl chlorides.

A wide variety of aryl and non-tertiary saturated hydrocarbon disulfides can be employed as charging stocks for the purposes of the present invention. A tertiary hydrocarbon disulfide contains completely substituted carbon atoms attached to the sulfur atoms, e. g. as in di-t-butyl disulfide. A non-tertiary alkyl or cycloalkyl disulfide contains at least one hydrogen atom (alpha-hydrogen) bound to each carbon atom which is directly attached to a sulfur atom. It is preferred that the hydrocarbon radicals in the disulfide charging stock contain no olefinic unsaturation. Suitable hydrocarbon radicals which may be present in the disulfide charging stock are non-tertiary alkyl, e. g., methyl, ethyl, n-propyl, isopropyl, n-butyl, 2-methylpropyl, neopentyl, n-amyl, isoamyl, n-hexyl, n-octyl, isooctyl, n-decyl, n-dodecyl, n-tetradecyl, n-hexadecyl, n-octadecyl and the like; non-tertiary cycloalkyl, e. g., cyclopentyl, cyclohexyl, ortho- or para-methylcyclohexyl, 2- or 3-methylcyclopentyl, bornyl and the like; non-tertiary aralkyl, e. g., benzyl, phenethyl and the like; aryl, e. g., phenyl, tolyl, xylyl, cumyl, ethyl phenyl, naphthyl, methylnaphthyl, xenyl and the like. The hydrocarbon radicals contained in the hydrocarbon disulfide charging stocks may also contain substituents such as halogen, nitro or carboxyl, or other atoms or groups. However, we prefer to employ unsubstituted hydrocarbon disulfide charging stocks, particularly non-tertiary alkyl disulfides, especially alkyl disulfides having 1 to 5 carbon atoms, inclusive, in the alkyl group. The process of the present invention can be applied to individual hydrocarbon disulfides or to mixtures of two or more thereof. The invention can also be applied to hydrocarbon disulfides containing diluents such as saturated hydrocarbons.

A particularly desirable application of the present process is to a mixture of non-tertiary alkyl disulfides such as are commercially produced by the treatment of naphthas by means of the well-known caustic-solutizer extraction processes and catalytic oxidation of the resultant mercaptide-containing caustic solutions with air or oxygen.

The present process can be conducted at temperatures between about −20° C. and about 50° C. Usually, it is convenient to operate at temperatures between about 0° C. and about 20° C., and temperatures between about 5° C. and about 15° C. are preferred. However, it will be apparent that reaction temperature is only one of the controlled variables in the present process and that, in general, lower reaction temperatures will be available for use with higher catalyst concentrations in the reaction zone than otherwise.

We prefer to employ commercial cylinder chlorine. However, the use of chlorine containing inert diluents is not excluded. The preferred source of oxygen in our process, for reasons of economy, is air, although other free oxygen-containing gases can be employed, for example, oxygen-enriched air, commercial cylinder oxygen, oxygen-containing flue gases and the like.

The stoichiometry of the process of the present invention can be expressed by the following equation:

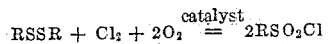

$$RSSR + Cl_2 + 2O_2 \xrightarrow{catalyst} 2RSO_2Cl$$

It will be apparent from the foregoing equation that the theoretical chlorine efficiency of the present process is 100 weight percent or 200 mol percent and that there is no chlorine wastage. It will also be apparent that the theoretically attainable oxygen efficiency in the present process is 100 weight percent or 100 mol percent. Therefore, in respect of oxygen efficiency, the present process offers a substantial advantage over processes for the conversion of sulfonic acids to sulfonyl chlorides, since the latter processes one-third of the oxygen in the charging stock is lost.

It will be apparent that less than the stoichiometrically required amounts of oxygen and chlorine can be employed in the present process, although that would limit the yield attainable in one operation. Moreover, it is possible to employ less than the stoichiometrically required amounts of oxygen and chlorine and to operate the process of the present invention in a number of passes.

In general, we may employ between about 2 and about 10 mols of oxygen, usually 2–3 mols, per mol of disulfide charging stock. Excesses of oxygen do not appear to exert an undesirable effect on the reaction.

In general, we may employ between about 0.9 and about 1.5 mols of chlorine per mol of disulfide charging stock and we prefer to employ between about 0.9 and about 1.1 mols of chlorine.

Excesses of chlorine up to about 0.5 mols excess of chlorine per mol of disulfide charging stock do not exert an appreciably undesirable effort on the reaction provided the chlorine is introduced as the oxidation proceeds and not in one single charge. However, in order to avoid possible chlorine substitution in the hydrocarbon radicals of the charging stock, it is usually desirable to employ not more than about 1 mol of chlorine per mol of the hydrocarbon disulfide charging stock. Further, in the interests of avoiding extensive chlorine substitution in the hydrocarbon radicals of the charging stock, it is desirable to avoid hydrocarbon chlorination influences, for example, strong visible light, ultraviolet light and chlorination catalysts. We have found that the present process can be satisfactorily carried out in diffused daylight without incurring the penalty of substantial chlorine substitution in the hydrocarbon radicals of the disulfide charging stock.

The nitrogen dioxide catalyst may be employed in proportions between about 0.02 and about 0.5 parts by weight per part by weight of oxygen charged. Ordinarily, it is desirable to employ nitrogen dioxide in proportions between about 0.05 and about 0.2 part by weight per part by weight of oxygen charged to the reaction zone, for example about 0.1 to about 0.2. The rate of reaction tends to increase with increasing $NO_2$ concentration in the reaction zone, other reaction conditions remaining constant.

It will be apparent that in lieu of, or in addition to $NO_2$, we can employ materials which will yield $NO_2$ in the oxidation reaction zone under the reaction conditions. Thus, for example, as is well-known, $NO_2$ is ordinarily in equilibrium with $N_2O_4$ and it will be apparent, therefore, that $N_2O_4$ can be employed in the present process in addition to $NO_2$ or in lieu thereof. It is also known that nitric oxide, NO, in the presence of oxygen, is in equilibrium with $NO_2$, which, in turn, is usually in equilibrium with $N_2O_4$. Therefore, nitric oxide can be employed as the source of $NO_2$ in the reaction zone in the process of the present invention. Likewise, $N_2O_3$ is usually in equilibrium with both NO and $NO_2$. In view of these and similar considerations it will be apparent, therefore, that in lieu of or in addition to $NO_2$, we can employ NO, $N_2O_3$, $N_2O_4$ and $N_2O_5$. Although it is well-known that nitric acid can decompose under certain conditions to yield $NO_2$, ordinarily we do not desire to employ nitric acid as a source of catalyst, since its decomposition also yields water, and it is desired to effect the present process in the substantial absence of water, which leads to undesirable side reactions such as reaction with chlorine and hydrolysis of the desired reaction product.

The $NO_2$ serves as a catalyst in the present process and can, for the most part, be recovered unchanged upon completion of the reaction. Upon completion of the desired reaction, catalyst which is either physically absorbed in the liquid reaction product or present in small proportions therein as nitrosylsulfonic acid, can be stripped therefrom by a stream of stripping gas such as nitrogen, air, $CO_2$ or the like, and thereafter recovered by conventional methods and reused. Catalyst can alternatively be removed by water washing or distillation of the reaction products. Catalyst present in the effluent gas stream during the operation of the present process can, likewise, be recovered by conventional means and recycled for use in the present process.

Our novel process may be carried out batchwise, continuously or semi-continuously. The present process may also be effected in a number of stages with or without product separation between stages. The oxidation reaction may be effected in conventional reaction kettles or autoclaves, or in a tubular convertor or contacting tower. A suitable form of reactor is a vertical tower provided with contacting means such as bubble cap trays or with packing such as ceramic bodies or fiber glass mats. Concurrent contacting of liquid hydrocarbon disulfide feed stock and the reactant gas stream proceeds efficiently in the types of reaction tower just described; the liquid feed is passed downwardly through the tower with a stream of oxidizing gas, all of which may be admitted at a point near the top of the tower or in aliquot portions at vertically spaced points along the tower. A tubular reactor equipped for spaced injection of reactant gas into a flowing stream of liquid or vaporized feed stock may also be employed; a reactor of this type permits fine control of the extent of reaction.

The following operating examples are included for the purpose of illustrating specific applications of the invention and not with the intent of unnecessarily delimiting the same.

Example 1

The reactor employed was a glass, concurrent flow, air-lift, gas-liquid reactor of the type previously employed in the oxidation of disulfides to alkanesulfonic acids, essentially as shown in Figure 2 of W. A. Proell, U. S. Patent 2,489,316. In this reactor the entrant reaction gases lift the liquid hydrocarbon disulfide through an indirect heat exchanger into the upper portion of a reaction column packed with glass beads or other inert surface-extending packing, through which the liquid and gaseous reactants flow concurrently downward while reacting, thence to a separating drum or receiver, whence partially converted liquids are recycled through the reaction system; gases are vented from said receiver and/or the lower end of the reaction zone. Ethyl disulfide (25 g.) was charged to the reactor, in which it was treated with a gas mixture consisting of 10 percent by volume of chlorine and 90 percent by volume of dry air, which was passed into the reactor for 6 hours at the rate of 1 cubic foot per hour at room temperature and atmospheric pressure. No gas volume contraction was noted and it is, therefore, apparent that no oxygen absorption and, therefore, no reaction occurred in the absence of a catalyst.

In another run, dry ethyl disulfide (25 g.) was treated in the same apparatus, initially at room temperature, with a mixture of 0.95 cubic foot (S. T. P.) of dry air, 0.073 cubic foot of chlorine and 0.045 cubic foot of nitrogen dioxide per hour at atmospheric pressure. The air feed was dried by passage through $CaCl_2$, charcoal and Dry Ice traps. After 5 minutes on stream, the temperature of the reacting liquid rose to 35° C. and the process was thereafter conducted at or about this temperature. During the active reaction period about 30 to about 35 percent by volume of the entrant oxygen reacted. After 6 hours on stream the oxygen absorption decreased to 0.05 percent of the entrant oxygen. An attempt at this time to increase the extent of oxygen absorption in the reaction mixture by raising the temperature to 70° C. resulted in no substantial increase in oxygen uptake. The weight of the reaction mixture was 27 g. The crude reaction mixture was subjected to distillation under the pressure of 43 mm. of mercury. Considerable nitrogen dioxide was evolved from the liquid reaction products early in the distillation and can be recovered for reuse. The distillation yielded 19.3 g. of ethanesulfonyl chloride, B. P. 177° C., 760 mm. (corr.), 2.2 g. of a material boiling over the range of 236 to 318° C. (760 mm.) and 1.7 g. of distillation residue. The high boiling distillate contains 2-chloroethanesulfonyl chloride. The distillation residue was largely carbonized material and some ethanesulfonic acid. The distillation loss of 3.8 g. is accounted for, in part, by the $NO_2$ which was evolved. It will be apparent that in one reaction stage, the present experiment yielded 36.6 percent of the theoretical yield of ethanesulfonyl chloride, based on the ethyl disulfide charged.

Example 2

Ethyl disulfide (25 g.; 0.205 mol) was charged to the glass reactor employed in Example 1. The disulfide was treated with a gas mixture consisting of approximately 11 percent chlorine, 7 percent $NO_2$, and 82 percent dry air by weight for 175 minutes at such a rate that 0.083 gms./min. (0.0017 mol) of chlorine entered the reaction. At the end of 175 minutes, the chlorine flow was stopped and the gas composition changed to approximately 11 percent $NO_2$ and 89 percent air. Oxidation was continued to completion in an additional 145 minutes. The temperature during the course of reaction was kept between 25 and 40° C. Distillation of the products yield 22.3 grams (0.173 mol) or 42.5 percent of theory of ethanesulfonyl chloride.

Example 3

Ethyl disulfide (05.5 g.) was reacted in the apparatus employed in previous examples with a gas mixture consisting of 19 weight percent chlorine, 5 weight percent $NO_2$ and 76 weight percent air, at temperatures between 21 and 28° C. and a system pressure of 25 mm. Hg over a period of 6 hours to produce 45.6 percent of the theoretical yield of ethanesulfonyl chloride, based on the ethyl disulfide charging stock.

Example 4

Normal amyl disulfide (50.1 g.; 0.243 mol) was charged to the reactor employed in Example 1 and was therein treated with a mixture of 81.0 percent by weight of dry air, 4.2 percent by weight of $NO_2$ and 14.8 percent by weight of chlorine at such a rate that 17.7 g. (0.4975 mol) of chlorine were introduced into the reactor in 330 minutes. At this time chlorine introduction was discontinued and the reaction mixture was treated an additional 40 minutes with a gas mixture of 5 percent by weight of $NO_2$ and 95 percent by weight of dry air. The temperature of the reacting liquid was maintained between 4° C. and 8° C. throughout the reaction period. The reaction mixture was thereafter vacuum distilled to yield 70.2 g. (0.418 mol), or 86.0 percent of theory, of 1-pentanesulfonyl chloride, B. P. 58° C./1.1 mm. of mercury, $n_D^{20}$ 1.4568 and density of 1.175 g. per ml. at 25° C. In addition, high boiling vacuum distillation bottoms were obtained having an acidity equivalent to 0.087 mol of 1-pentanesulfonic acid.

Example 5

Normal amyl disulfide (45.95 g.; 0.218 mol) was charged to the reactor employed in Example 1 and was therein treated with a gas consisting of 85.5 percent dry air, 4.9 percent $NO_2$ and 9.6 percent chlorine by weight at such a rate that 15.85 g. (0.446 mol) of chlorine entered the reactor in 330 minutes. The temperature of the reacting liquid was 34-36° C. Chlorine introduction was then discontinued and the reaction mixture was treated with a gas consisting of 6 percent $NO_2$ and 94 percent dry air by weight for an additional 60 minutes. Distillation of the reaction mixture yielded 17.9 g. (0.105 mol) of 1-pentanesulfonyl chloride, B. P. 61° C./1.3 mm., $n_D^{20}$ 1.4567. In addition, a distillation bottoms material was obtained having an acidity corresponding to 0.032 mol of 1-pentanesulfonic acid.

*Example 6*

The charging stock was a commercial mixture of disulfides, obtained by caustic-solutizer extraction of naphtha, having the following approximate composition: 30% diethyl disulfide, 42% ethyl propyl disulfides, 10% ethyl butyl disulfides, 12% dipropyl disulfides, 6% propyl butyl disulfides and less than 1% of dibutyl disulfides. The average molecular weight of the disulfide mixture was 122. The charging stock (55.1 g.) was treated with a gas mixture consisting of 14.1% chlorine, 4.1% $NO_2$ and 81.8% of dry air by weight at such a rate that 31.9 g. of chlorine entered the reactor at 300 minutes. The hourly flow rate of air was 0.84 cubic foot (standard conditions). Oxidation, as evidenced by contraction of the air volume, began immediately and proceeded evenly with the utilization of the 6-21% of the available oxygen. At the end of 300 minutes on stream, chlorine introduction was discontinued and the reaction mixture was treated for an additional 35 minutes with a gas consisting of 5% $NO_2$ and 95% by weight of air. The temperature throughout the reaction period was maintained between 3 and 7° C. and the pressure on the reaction system was 42 mm. mercury. The reaction products were vacuum distilled to yield 59.6 g. of a mixture of sulfonyl chlorides boiling in the range of 76° C./51 mm. to 68° C./8.9 mm. of mercury. The refractive index ($n_D^{20}$) of the mixture of sulfonyl chlorides was 1.4568. The yield of sulfonyl chlorides calculated as ethanesulfonyl chloride was 51.5% of theoretical. In addition, the distillation bottoms exhibited an acidity equivalent to 4.80 g. of ethanesulfonic acid.

The following experiment is illustrative of the widely different behavior of a t-alkyl disulfide. Di-t-butyl disulfide (53.3 g.; 0.299 mol) was charged to the reactor described in Example 1 and was therein treated with a gas mixture consisting of 4.4% $NO_2$, 12.4% chlorine and 83.2% dry air by weight at such a rate that 21.2 g. of chlorine entered the reactor in 300 minutes. The temperature of the reacting liquid was maintained at 30-34° C. and the reaction pressure was 42 mm. of mercury. No evidence of oxidation was noted during this period. After 145 minutes on stream, two liquid phases were apparent in the reaction zone and at the end of 300 minutes on stream, three liquid phases were present. Examination of the reaction products showed the presence of 2.5 g. of polysulfides, 24.4 g. of sulfuric acid and 42.8 g. of t-butyl chloride. None of the desired t-butyl sulfonyl chloride was produced. The analytical data indicate that 87% of the theoretical yield of t-butyl chloride was produced and, therefore, the predominating reaction was cleavage between carbon and sulfur atoms rather than between sulfur and sulfur atoms in the charging stock, as would be desired for the production of t-butyl sulfonyl chloride.

The hydrocarbon sulfonyl chlorides produced by the process of the present invention, particularly the non-tertiary alkanesulfonyl chlorides, can be hydrolyzed to produce very pure sulfonic acids, e. g., alkanesulfonic acids which can be employed as electroplating media, especially for high speed (high current density) copper plating baths. The pure hydrocarbon sulfonic acids thus rendered available are also highly useful esterification catalysts, especially for the esterification of acid-sensitive materials such as cellulose, glycols, etc. The mixed alkanesulfonyl chlorides which are produced by the application of the present process to mixed alkyl disulfides can readily be separated by fractional distillation and separately hydrolyzed to yield individual, high purity alkanesulfonic acids.

Copending Serial No. 176,061 of even date herewith, filed by Wilbur B. Chilcote et al. relates to the low temperature chlorinolysis of non-tertiary hydrocarbon disulfides to produce sulfenyl chlorides. Copending Serial No. 176,062 of even date herewith, and now U. S. Patent No. 2,573,674, issued November 6, 1951, filed by Chester E. Adams et al. relates to the oxidation of sulfenyl halides with oxygen in the presence of $NO_2$ catalyst to produce sulfonyl halides. Copending Serial No. 176,063 of even date herewith, filed by Wayne A. Proell et al. relates to the use of partially oxidized feed stock as a primer to avoid an induction period in $NO_2$-catalyzed oxidation of sulfenyl halides to sulfonyl halides.

Having thus described our invention, what we claim is:

1. A process for the preparation of a hydrocarbon sulfonyl chloride, which process comprises simultaneously contacting a non-tertiary hydrocarbon disulfide, chlorine and oxygen under substantially anhydrous conditions in the presence of a catalytic proportion of $NO_2$ at a reaction temperature between about —20° C. and about 50° C. under pressure sufficient to maintain a liquid phase of said hydrocarbon disulfide.

2. A process for the preparation of a hydrocarbon sulfonyl chloride, which process comprises simultaneously contacting a non-tertiary hydrocarbon disulfide, between about 0.9 and about 1.5 mols of chlorine and between about 2 and about 10 mols of oxygen per mol of said hydrocarbon disulfide under substantially anhydrous conditions in the presence of between about 0.02 and about 0.5 parts by weight of $NO_2$ per part by weight of said oxygen at a temperature between about —20° C. and about 50° C. under pressure sufficient to maintain a liquid phase of said hydrocarbon disulfide.

3. The process of claim 2 wherein said hydrocarbon disulfide is a saturated non-tertiary hydrocarbon disulfide.

4. The process of claim 2 wherein said hydrocarbon disulfide is a non-tertiary alkyl disulfide.

5. The process of claim 2 wherein said hydrocarbon disulfide is ethyl disulfide.

6. The process of claim 2 wherein said hydrocarbon disulfide is n-amyl disulfide.

7. The process of claim 2 wherein a mixture of $C_2$-$C_4$ alkyl disulfides is employed as charging stock.

8. A process for the preparation of a hydrocarbon sulfonyl chloride, which process comprises simultaneously contacting a non-tertiary alkyl disulfide, between about 0.9 and about 1.1 mols of chlorine and between about 2 and about 3 mols of oxygen per mol of said alkyl disulfide under substantially anhydrous conditions in the presence of between about 0.05 and about 0.5 parts by weight of $NO_2$ per part by weight of said oxygen at a temperature between about $-20°$ C. and about 50° C. under pressure sufficient to maintain a liquid phase of said alkyl disulfide.

9. The process of claim 8 wherein said temperature is between about 0° C. and about 20° C.

10. A process for the preparation of a hydrocarbon sulfonyl chloride, which process comprises simultaneously contacting a non-tertiary hydrocarbon disulfide, chlorine and oxygen under substantially anhydrous conditions in the presence of a catalytic proportion of $NO_2$ at a reaction temperature between about 0° C. and about 20° C. under pressure sufficient to maintain a liquid phase of said hydrocarbon disulfide.

WAYNE A. PROELL.
WILBUR B. CHILCOTE.
BERNARD H. SHOEMAKER.

REFERENCES CITED

The following references are of record in the file of this patent:

UNITED STATES PATENTS

| Number | Name | Date |
| --- | --- | --- |
| 2,465,952 | Witte | Mar. 29, 1949 |